United States Patent [19]
Towsend

[11] Patent Number: 4,862,509
[45] Date of Patent: Aug. 29, 1989

[54] PORTABLE RECORDING SYSTEM FOR TELEPHONE CONVERSATIONS

[75] Inventor: Marvin S. Towsend, Rockville, Md.

[73] Assignee: Genvention, Inc., Rockville, Md.

[21] Appl. No.: 115,857

[22] Filed: Nov. 2, 1987

Related U.S. Application Data

[63] Continuation-in-part of Ser. No. 107,193, Oct. 13, 1987, abandoned.

[51] Int. Cl.$^4$ .................... H04M 1/21; H04R 1/10
[52] U.S. Cl. .................... 381/163; 379/78; 379/85; 379/444; 381/169; 381/187
[58] Field of Search .............. 379/78, 85, 52, 444, 379/430; 381/68.6, 163, 169, 187

[56] References Cited

U.S. PATENT DOCUMENTS

| | | | |
|---|---|---|---|
| 1,567,683 | 12/1925 | Smith | 379/85 |
| 2,479,806 | 8/1949 | Berkeley | 379/444 |
| 2,498,239 | 2/1950 | Berkeley | 379/444 |
| 2,538,452 | 1/1951 | Harrington | 379/74 |
| 2,904,640 | 9/1959 | Dreher et al. | 379/430 |
| 3,322,897 | 5/1967 | Vozeolas et al. | 379/443 |
| 4,335,281 | 6/1982 | Scott et al. | 379/430 |
| 4,476,353 | 10/1984 | Haertl | 381/68.6 |

FOREIGN PATENT DOCUMENTS

| | | | |
|---|---|---|---|
| 0014401 | 2/1977 | Japan | 381/68.6 |
| 0023952 | 2/1984 | Japan | 379/85 |
| 0269499 | 11/1986 | Japan | 379/67 |

OTHER PUBLICATIONS

Plantronics, Inc. product announcement, "Cordless Phone", Telephony, Jun. 8, 1987, pages 68,69.

*Primary Examiner*—Thomas W. Brown
*Attorney, Agent, or Firm*—Marvin S. Towsend

[57] ABSTRACT

A portable system for recording telephone conversations from a telephone and also for recording face-to-face conversations includes a portable, battery-powered audible sound recorder carried by the user, a microphone connected to the recorder, and a microphone support which is supported by the ear of the user for retaining the microphone between the telephone earpiece and the inner portion of the auditory meatus of the user. By locating the microphone near the auditory meatus or in the outer portion of the auditory meatus of the user, sounds of the face-to-face conversation and sounds of the telephone conversation from the earpiece are recorded on the recorder. With the recording system of the invention, there is no physical contact between the microphone and the telephone earpiece. A microphone holder is also disclosed for retaining a small microphone near or in the auditory meatus of the user. By using the microphone holder, any conventional portable audio recorder in conjunction the small microphone can be converted into a portable telephone conversation recording system or portable face-to-face conversation recording system. A combined microphone/speaker can be used for both recording sounds and for playing back the recorded sounds.

32 Claims, 5 Drawing Sheets

PORTABLE RECORDING SYSTEM FOR TELEPHONE CONVERSATIONS

CROSS REFERENCE TO RELATED APPLICATION

This application is a continuation-in-part application of parent application Ser. No. 107,193, filed Oct. 13, 1987, subsequently abandoned, by the same inventor.

FIELD OF THE INVENTION

The present invention relates to the field of recording audible conversations between persons, and more particularly to recording telephone conversations.

BACKGROUND OF THE INVENTION

In the art of recording conversations between persons, portable audio recorders are well known. With such recorders a portable microphone is associated with the sound recording apparatus, and the audio recorder records the conversation at the same time the participants in the conversation are conversing. The microphone is often integrated into the structure of the recorder. Otherwise, a portable microphone is connected to the sound recording apparatus by a wire conductor. Although such a conventional portable audio recorder is suitable for recording conversations between persons having a face-to-face conversation, such a sound recording system is not suitable for recording telephone conversations as they are being conducted using a hand-held telephone receiver.

Telephone conversations conducted over a telephone equipped with a room speaker, commonly known as a speaker phone, can be recorded by conventional portable audio recording apparatus. However, when the telephone conversation is conducted using a hand-held receiver, conventional portable audio recording apparatus is not suitable.

Special transducers are known for recording telephone conversations conducted with hand-held telephone receivers. Such special transducers are adapted to physically contact a portion of the hand-held receiver at a location somewhere near the portion of the receiver that contacts the pinna portion of the ear of the user. Such known telephone transducers receive sound waves conducted through the body of the telephone receiver by maintaining a close physical contact therewith. They do not pick up sound waves from the air as does a conventional microphone. Such telephone transducers are generally of two types: a transducer having a ring-like adaptor for contacting the transducer with the telephone receiver; and a transducer having a suction cup for securing the telephone transducer onto the telephone receiver.

Both types of known transducers for hand-held telephone receivers have significant problems associated with their use. One problem relates to the conduction of sound through the telephone receiver to the telephone transducer. Not all telephone receivers are fabricated from materials which conduct sound efficiently. When conventional telephone transducers are employed with telephone receivers fabricated from materials which do not conduct sound efficiently, the sound transmitted through the telephone receiver to the telephone transducer ranges from poor to nonexistent. Therefore, it would be desirable to have a telephone sound pick up device whose operation does not depend upon sound transmitted through the body of the telephone receiver to the transducer.

Another problem associated with conventional telephone transducers is the effectiveness of physical contact between the telephone transducer and the telephone receiver. For example, the ring-like adaptor for a conventional telephone transducer may be formed in the shape of a circle and my not be effectively adapted for use on a telephone receiver having a square shaped earpiece. As another example, the suction cup adaptor for a telephone transducer may not readily maintain adequate suction if the suction cup or the telephone earpiece gets dirty. It is most disconcerting to have a suction cup type telephone transducer pop off of the telephone in the middle of an important conversation. Therefore, it would be desirable to have a telephone sound pick up device whose operation does not depend upon physical contact between a transducer adaptor and the body of the telephone receiver.

Another way to record telephone conversations is to have an audio recorder electrically connected to the telephone. With this arrangement, audio information is recorded directly as electrical information without passing through a conversion to sound energy. This method of recording telephone conversations is more expensive and complex than the use of a conventional audio recorder in a proprietary office environment, but this method is impossible to use when the telephone does not belong to the user such as a telephone in a public telephone booth. Therefore, it would be desirable to provide a telephone conversation recording system which does not require electrical connection to the telephone that is used and is capable of recording conversations using non-owned telephones such as in a public telephone booth.

Portable audio tape recorders generally include a speaker so that playback of recorded sound is audible to the user. The speaker is generally housed in the general housing for the tape recorder, and the played back sound is audible to anyone who might be present in the general vicinity of the person using the recorder in the playback mode. Some recorders, however, are equipped with add-on ear speakers which bring the recorded sound directly to the ear of the user thereby bringing greater privacy and causing less audible disturbance. Therefore, it would be desirable to provide an audio tape recorder that provides for recording telephone conversations and also permits playback of the conversations directly to an ear of the user.

A portable audio tape recorder generally includes a microphone for recording sound and a speaker for playing back recorded sounds. It would. be desirable, however, to provide a single microphone/speaker that both records sounds when the tape recorder is in the record mode and that also serves as a speaker to play back recorded sounds when the recorder is used in the play back mode.

SUMMARY OF THE INVENTION

Accordingly, it is a primary object of the present invention to provide a telephone conversation recording device whose operation does not depend upon sound transmitted through the body of the telephone receiver to the pick up device.

Another object of the invention is to provide a telephone conversation pick up device whose operation does not depend upon physical contact between a transducer adaptor and the body of the telephone receiver.

An additional object of the invention is to provide a portable system capable of recording both face-to-face conversations and telephone conversations without alteration of the system.

The anatomy of the human ear includes the outer ear, the middle ear, and the inner ear. The outer ear includes the pinna, the auditory meatus, and the eardrum. Sound that is picked up by the ear passes by the pinna into the outer portion of the auditory meatus, into the inner portion of the auditory meatus, and to the eardrum. Herein, the outer portion of the auditory meatus refers to the portion of the auditory meatus which is adjacent to the entrance to the auditory meatus at the pinna. Herein, the inner portion of the auditory meatus refers to the portion of the auditory meatus adjacent to the eardrum.

A further object of the invention is to provide a means for placing a microphone connected to a portable audio tape recorder near or in the outer portion of the auditory meatus of the user.

Another object of the invention is to provide a means for recording telephone conversations without making electrical connection with the telephone.

Yet another object of the invention is to provide a telephone conversation recording system that is capable of recording conversations using non-owned telephones such as in a public telephone booth.

Yet another object of the invention is to provide an audio tape recorder that provides for recording telephone conversations and also permits playback of the conversations directly to an ear of the user.

Still another object is to provide a single microphone/speaker that both records sounds when the tape recorder is in the record mode and that also serves as a speaker to play back recorded sounds when the recorder is used in the play back mode.

Additional objects, advantages, and novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, a system is provided for recording telephone conversations from a telephone that has an earpiece. The improved system of the invention includes an audible sound recorder, a microphone connected to the audible sound recorder, and means for retaining the microphone between the telephone earpiece and the inner portion of the auditory meatus of the user. Preferably, the sound recorder is a portable unit carried by the user.

In the one class of embodiments, the means for retaining the microphone between the telephone earpiece and the inner portion of the auditory meatus of the user is supported by the ear of the user.

One means for supporting the microphone by the user's ear is by using a J-shaped hook-like support which fits over the top portion of the pinna of the ear. This microphone support supports the microphone at a location near the entrance to the auditory meatus of the user but not inserted into the outer portion of the auditory meatus.

A second means for supporting the microphone by the user's ear is a conical ear plug. With the conical ear plug, a portion of the plug is inserted into the outer portion of the auditory meatus of the user. With the conical ear plug, a portion of the plug extends into the auditory meatus, and a portion of the plug may project into the air space between the telephone earpiece and the auditory meatus. The air space is defined by the inner surfaces of the pinna of the user. The microphone can be located in either portion of the ear plug.

In accordance with another aspect of the invention, a system is provided for recording both face-to-face conversations and telephone conversations. By retaining the microphone near or in the outer portion of the auditory meatus of the user, both face-to-face conversations and telephone conversations can be picked up by the same microphone and recorded by the same recording apparatus. A portion of the sounds of the conversation are simultaneously recorded by the system of the invention and heard by the user of the system without any simultaneous signal processing or sound amplification.

In one embodiment, the microphone is located between the telephone earpiece and the outer portion of the auditory meatus of the user without making physical contact with the telephone earpiece. More specifically, when a telephone earpiece is generally placed up against the pinna of the outer ear, there is an air space between the inner surface of the telephone earpiece and the opening to the auditory meatus. The air space is defined by the inner surfaces of the pinna of the user. Sound from the telephone earpiece travels through this air space into the auditory meatus and to the eardrum enabling the person to hear the opposite party speaking on the telephone. In accordance with the invention, the microphone is located in this air space without physically contacting the inner surface of the earpiece. A portion of the sound waves being transmitted from the earpiece of the telephone toward the auditory meatus of the listener is in effect intercepted by the microphone placed in the air space. Thereby, the same sounds that are heard by the listener without any simultaneous signal processing or sound amplification are also simultaneously picked up by the microphone in accordance with the invention.

In accordance with another aspect of the invention, another system is provided for recording telephone conversations from a telephone. In this recording system, an additional microphone may be provided especially for recording the speech of the person using the invention who is recording the telephone conversation. In explanation, the primary microphone of the invention is located in the air space between the earpiece of the telephone receiver and the auditory meatus. The air space is defined by the inner surfaces of the pinna of the user. In this location, there may be difficulty for the sound waves of the speech of the user to propagate from the mouth of the user into the air space and into the primary microphone. If such is the case, a second microphone may be provided that is located outside of the above-mentioned air space. By placing the second microphone closer to the mouth of the user, sound waves from the mouth of the user are easily picked up by the second microphone. Both microphones are connected to the recorder.

The second microphone can be completely eliminated when the first microphone of the invention is sufficiently sensitive to pick up speech both from the earpiece and the mouth of the user. In this regard, the mouthpiece of the hand-held telephone receiver may direct a portion of the speech of the user through the receiver handle up to the earpiece. If this mode of transmission occurs, then there is no need for the second microphone.

In accordance with another aspect of the invention, a microphone holder is provided for a microphone connected to an audio recorder. The microphone holder includes means for retaining the microphone near the inner portion of the auditory meatus of the user. The microphone retaining means is supported by the head of the user. In one embodiment, the microphone retaining means is supported by the user's ear. More specifically, the microphone can be retained near the user's auditory meatus by a J-shaped structure that supports the microphone and that fits over the top of the pinna of the user's ear. In addition, the microphone can be retained near the user's auditory meatus by a conical ear plug that supports the microphone and that fits in the outer portion of the auditory meatus of the user's ear.

By using the microphone holder of the invention for retaining a small microphone entirely in the air space defined by the inner surfaces of the pinna of the user or in the auditory meatus of a user, any conventional portable audio recorder in conjunction the small microphone can be converted into a telephone conversation recording system of the invention or converted into a face-to-face conversation recording system of the invention by simply connecting the small microphone to the portable audio recorder.

In accordance with another aspect of the invention, another system for recording both face-to-face conversations and telephone conversations from a telephone having an earpiece is provided. This sound recording system includes a portable audible sound recorder which has sound recording circuitry and circuitry for playing back the recorded sound. A small microphone is connected to the audible sound recorder. The microphone is connected to the circuitry for recording sound. A small speaker is connected to the circuitry for playing back the recorded sound. The microphone and speaker are sufficiently small to be placed in the space between the telephone earpiece and the auditory meatus of the user.

A holder is used for retaining the microphone and the speaker entirely in the air space defined by the inner surfaces of the pinna of the user near the outer portion of the auditory meatus of the user thereby permitting the sound recorder to record sound received through the telephone earpiece and the sound from a face-to-face conversation and also permitting the recorded sound to be played back into the auditory meatus of the user.

The microphone and the speaker may be comprised of a unitary transducer serving as both microphone and speaker. The microphone/speaker may further include a plug connector for selectively connecting with either the circuitry for recording sound or the circuitry for playing back the recorded sound.

The microphone and the speaker may also be a separate microphone and a separate speaker in close proximity to one another.

The sound recorder may further include a mode switch for switching from the microphone connection with the circuitry for recording sound to the speaker connection with the circuitry for playing back the recorded sound and a vice versa.

In accordance with another aspect of the invention, a holder is provided for supporting both the microphone and the speaker that are connected to the audio recorder. The microphone and speaker holder includes means for retaining the microphone and the speaker near the auditory meatus of an user. The means for retaining the microphone and the speaker are supported by the head of the user, and preferably by the ear of the user, and most preferably by the pinna of the user's ear.

The microphone and speaker holder may also be supported by the auditory meatus of the user's ear.

The microphone and speaker holder may include means for reversing the orientation of the microphone and the speaker with respect to the auditory meatus of the user. More specifically, a ball and a socket connection between the microphone and speaker and the remainder of the holder can be used for reversing the orientation of the microphone and speaker.

The means for reversing the orientation of the microphone and the speaker may also include a housing that has two ends, each end of the housing adapted to be inserted in the auditory meatus of the user.

The means for reversing the orientation of the microphone and speaker may also include a housing that has one end adapted to be inserted in the auditory meatus of the user. Such a reversing means may further include a reversible sound reflector for selectively reflecting sound either toward the microphone in a direction facing away from the auditory meatus of the user or toward the speaker in a direction facing toward the auditory meatus of the user.

Still other objects of the present invention will become readily apparent to those skilled in this art from the following description, wherein there is shown and described a preferred embodiment of this invention. Simply by way of illustration, the invention will be set forth in part in the description that follows and in part will become apparent to those skilled in the art upon examination of the following or may be learned with the practice of the invention. . Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 4 is a schematic view of an embodiment of the invention showing a unitary microphone/speaker supported by a holder which includes a ball and socket capable of reversing the orientation of the microphone/speaker with respect to the auditory meatus;

wherein the microphone/speaker is connected to a mode switch on the audio recorder;

DETAILED DESCRIPTION OF THE PREFERRED EMBODIMENTS

Figure 1:
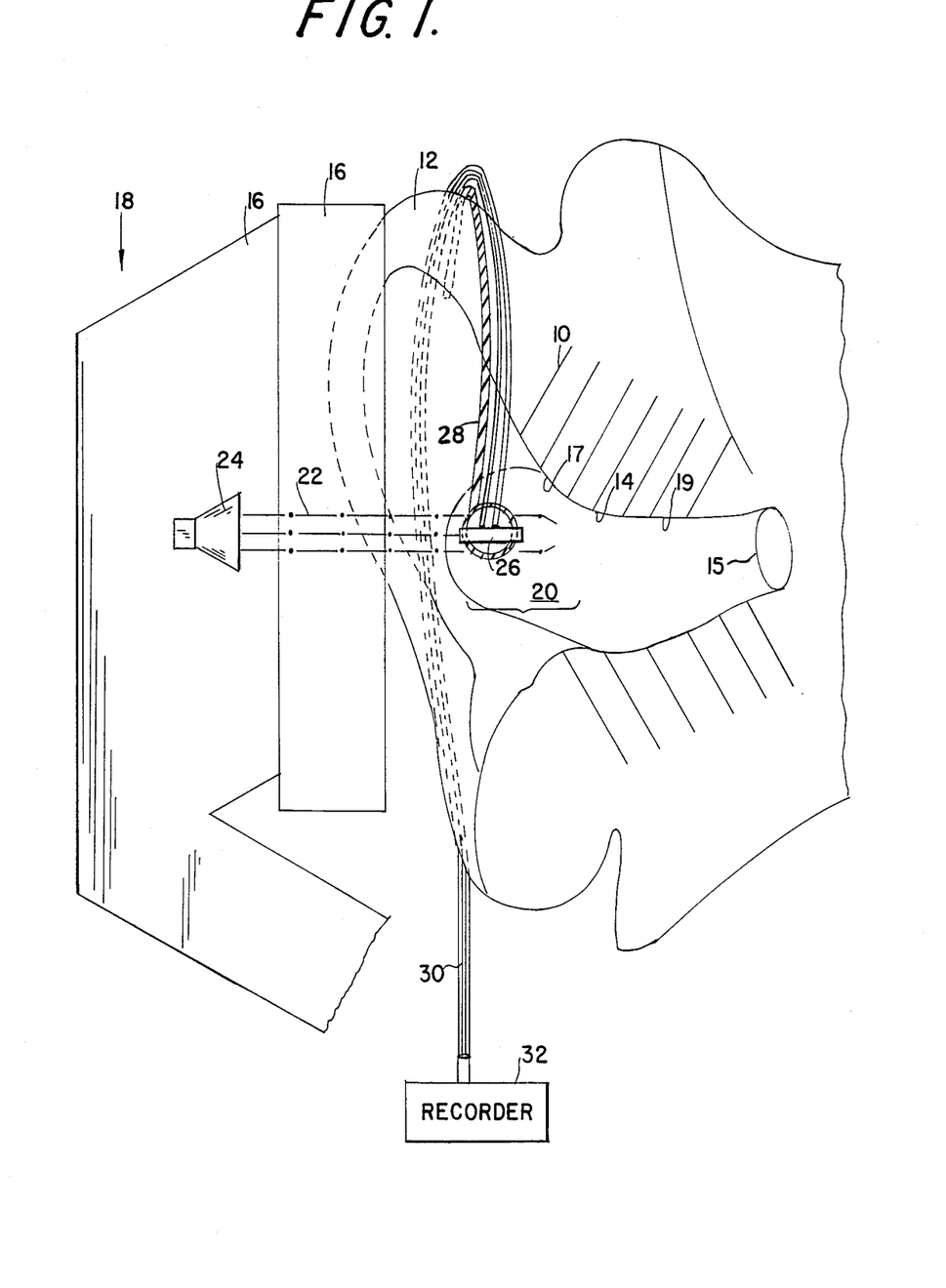
FIG. 1 a schematic view of an embodiment of the invention wherein a microphone is located in the air space defined by the inner surfaces of the pinna of the user between the telephone earpiece and the outer portion of the auditory meatus of the user.

With reference to the drawings, and more particularly to FIG. 1, there is disclosed an embodiment of the system of the present invention for recording telephone conversations and face-to-face conversations. The user of a telephone has a head 10 which includes an ear having an outer pinna 12, an auditory meatus 14, and an eardrum 15. The auditory meatus 14 has an outer portion 17 adjacent to the entrance of the auditory meatus and an inner portion 19 adjacent to the eardrum 15. When an earpiece 16 of a hand-held telephone receiver 18 is place up against the pinna 12 of the ear, an air space 20 exists between the earpiece 16 and the auditory meatus 14. When a person listens to a telephone conversation, sound waves 22 are transmitted from the small speaker 24 is the earpiece 16 through the air space 20 defined by the inner surface of the pinna 12 to the auditory meatus 14 thereby permitting the person to hear the other party.

In accordance with one embodiment of the invention, a microphone 26 is supported and retained by a tubular support 28 in the air space 20. Tubular support 28 has a J-shaped portion which fits over the top side of the pinna 12 thereby permitting the pinna to support the support 28. Because the microphone 26 is located in the air space 20, a portion of the sound waves 22 that emanate from the small speaker 24 are picked up by the microphone 26.

A cable 30 runs from the microphone 26 to a recorder 32 which is a conventional battery-powered portable audio cassette recorder.

When the earpiece 16 rests against the pinna 12, the microphone 26 picks up both the sound received from the small speaker 24 in the earpiece and the sound transmitted from the mouth of the user (see FIG. 2), through a mouthpiece 34, through a handle 36, and through the earpiece 16 to the microphone 26.

When the telephone earpiece 16 is in a location away from the user's ear, then there is no obstacle to the microphone 26 recording a face-to-face conversation without alteration of either the connections of the apparatus or the positioning of the apparatus. The location of the microphone 26 near the entrance to the auditory meatus 14 provides the unique feature that the microphone 26 picks up substantially the same sounds that the auditory meatus 14 itself picks up.

Figure 2:
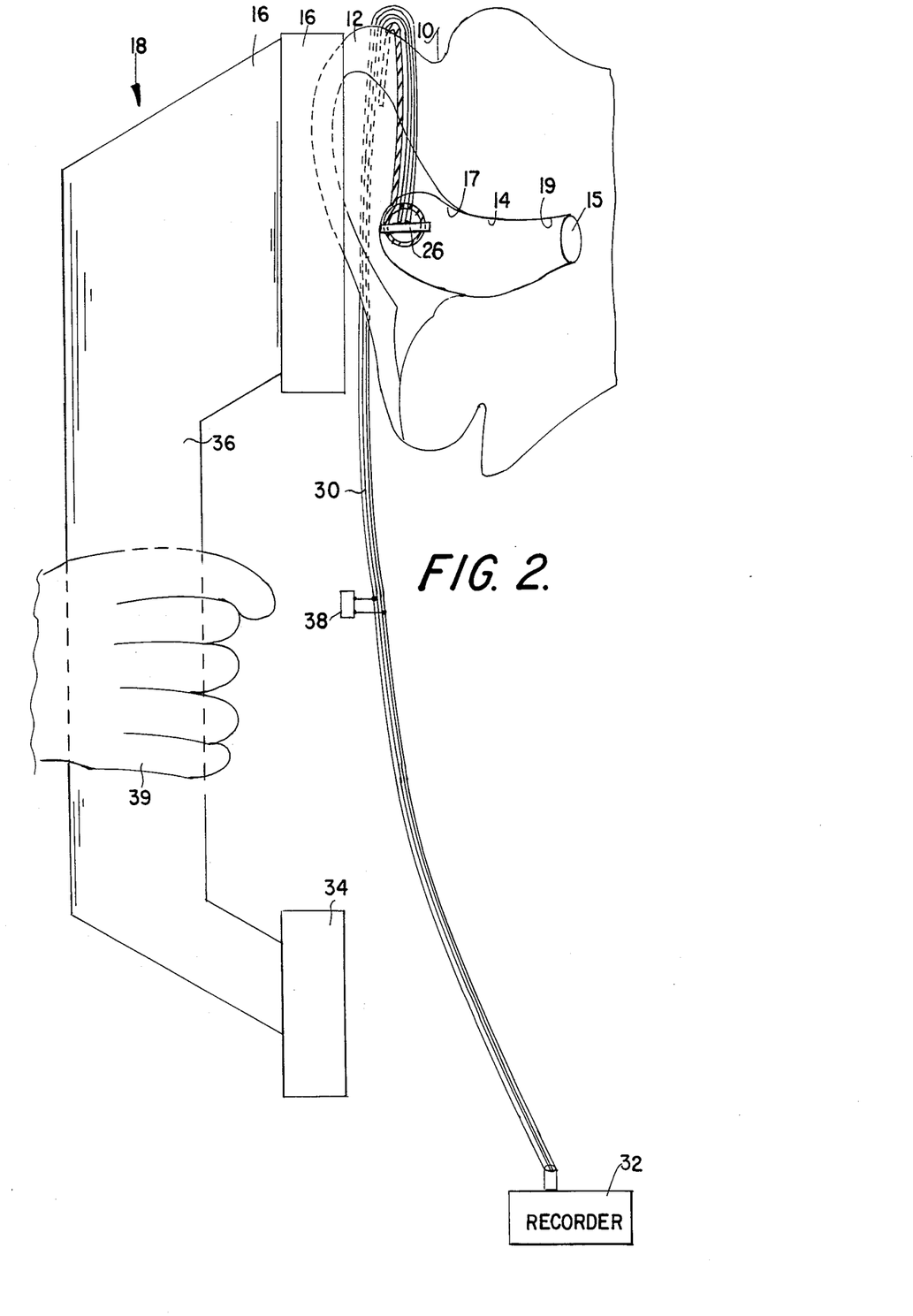
FIG. 2 is a schematic view of another embodiment of the invention in which a second microphone is located outside the air space between the telephone earpiece and the auditory meatus of the user to be nearer to the mouth of the user.

In accordance with another aspect of the invention, reference is made to FIG. 2 which shows the use of two microphones, first microphone 26 and second microphone 38 used in conjunction with the hand-held telephone receiver held by the user's hand 39. First microphone 26 in located in the air space 20, and second microphone 38 is located along the cable 30 and supported thereby. Second microphone 38 is outside the air space 20 and is located in a position permitting picking up the speech of the user. Both microphones 26 and 38 are connected to the recorder 32 by cable 30.

Figure 3:
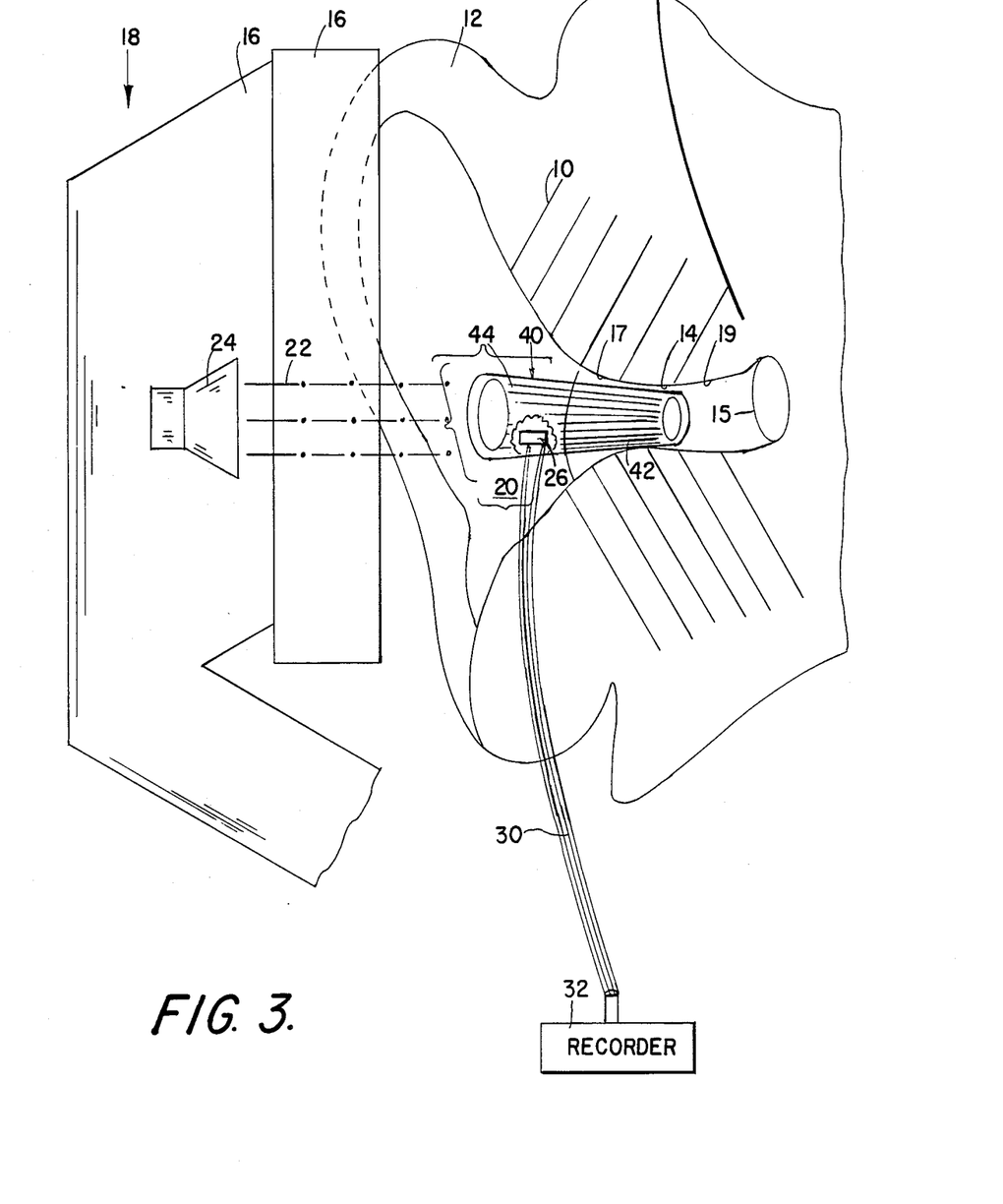
FIG. 3 is a schematic view of an embodiment of the invention wherein a microphone is supported by aconical ear plug a portion of which fits into the outer portion of the auditory meatus of the user.

In accordance with another aspect of the invention, reference is made to FIG. 3 where a conical ear plug 40 supports the microphone 26. With the conical ear plug 40, a first portion 42 of the plug 40 is inserted in the outer portion 17 of the auditory meatus 14 of the user. With the conical ear plug 40, a second portion 44 of the plug may project into the air space 20 between the telephone earpiece 16 and the auditory meatus 14. The microphone 26 is shown in FIG. 3 to be located in the second portion 44 of the ear plug 40.

However, the microphone 26 can also be located in the first portion 42 of the ear plug 40 which is inserted into the outer portion 17 of the auditory meatus 14. Whether the microphone 26 is located in the air space 20 or located in the outer portion 17 of the auditory meatus 14, the sound waves of either a telephone conversation or a face-to-face conversation pass into the inner portion 19 of the auditory meatus 14 to the eardrum 15 so that the sound waves are heard by the user of the system of the invention.

In FIGS. 1-3, there is no electrical connection between the microphones 26 and 38 and the telephone itself. Because there need be no physical contact between the recording system of the invention and the telephone on which the recording is made, the system of the invention is particularly useful for recording telephone conversations on public telephones.

Figure 4:
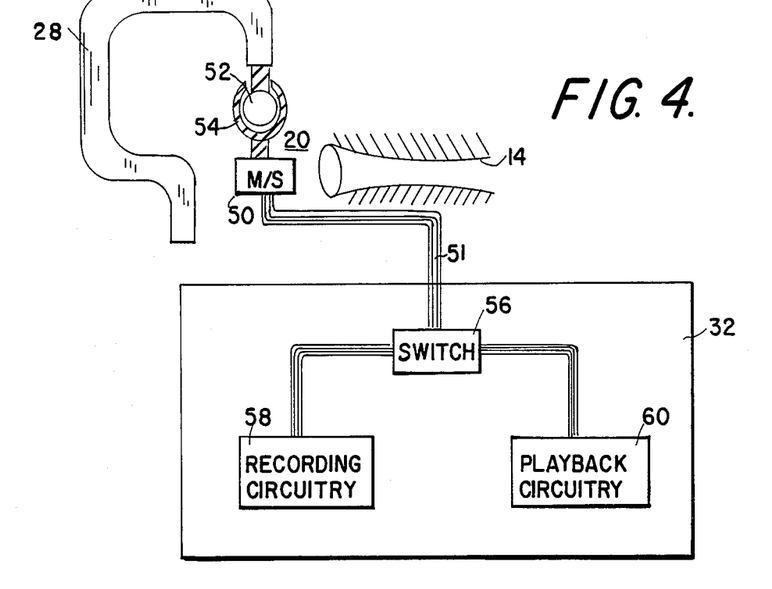

FIG. 4 is a schematic view of an embodiment of the invention showing a unitary microphone/speaker 50 supported by a holder 28 which includes a ball 52 and socket 54 capable of reversing the orientation of the microphone/speaker 50 with respect to the auditory meatus 14. The microphone/speaker 50 is small enough to be placed in the space 20 between the telephone earpiece 16 and the auditory meatus 14 of the user. The microphone/speaker 50 is connected by cable 51 to a mode switch 56 on the audio recorder 32. The sound recorder 32 includes sound recording circuitry 58 and circuitry 60 for playing back the recorded sound. The mode switch 56 is used to switch the microphone/speaker 50 from the sound recording circuitry 58 to the play back circuitry 60 and vice versa.

Figure 5:
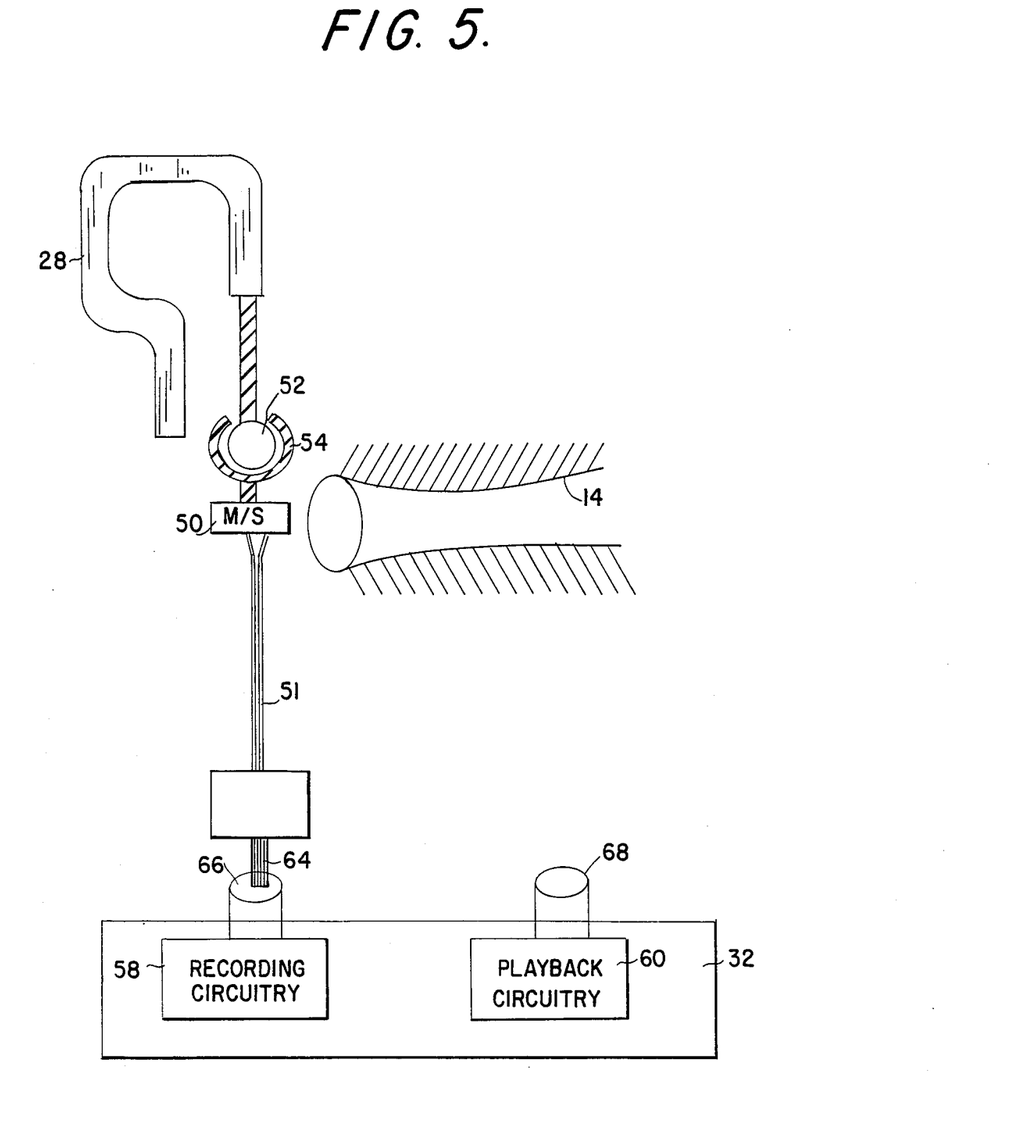
FIG. 5 is a schematic view of an embodiment of the invention showing a unitary microphone/speaker supported by a holder which includes a ball and socket capable of reversing the orientation of the microphone/speaker with respect to the auditory meatus; wherein the microphone/speaker is connected to a plug connecter that is selectively connected to the circuitry for recording sound and the circuitry for playing back the recorded sound of the audio recorder.

FIG. 5 is a schematic view of an embodiment of the invention showing a unitary microphone/speaker 50 supported by a holder 28 which includes a ball 52 and socket 54 capable of reversing the orientation of the microphone/speaker 50 with respect to the auditory meatus 14. The microphone/speaker 50 is connected by cable 51 to a plug connecter 64 that is selectively connected to a jack 66 for the circuitry 58 for recording sound or to a jack 68 for the circuitry 60 for playing back the recorded sound of the audio recorder 32. In FIG. 5, the plug connector 64 is inserted in the jack 66 for recording sound.

Figure 6:
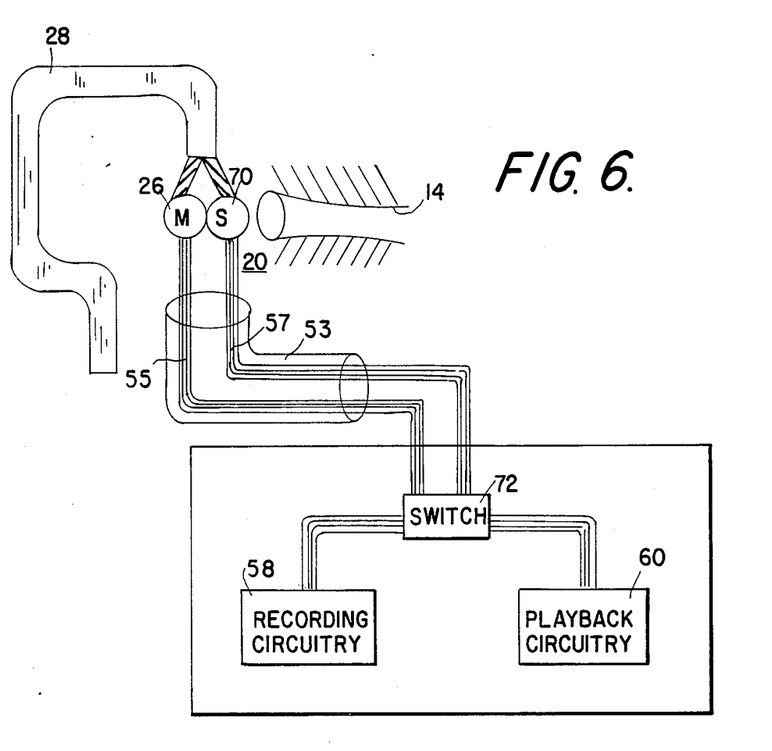
FIG. 6 is a schematic view of an embodiment of the invention showing a microphone and a speaker that are separate and distinct but that are in close proximity to one another; and wherein both microphone and speaker are located near the auditory meatus of the user with the microphone facing away from the auditory meatus and the speaker facing toward the auditory meatus.

FIG. 6 is a schematic view of an embodiment of the invention showing a microphone 26 and a speaker 70 that are separate and distinct but that are in close proximity to one another. Both the microphone 26 and speaker 70 are located near the auditory meatus 14 of the user with the microphone 26 facing away from the auditory meatus 14 and the speaker 70 facing toward the auditory meatus.

As shown in FIG. 6, a cable 53 containing wires 55 and 57 running from the microphone 26 and speaker 70, respectively, is connected to the sound recorder 32 which further includes a mode switch 72 for switching from the microphone 26 connection with the circuitry for recording sound 58 to the speaker 70 connection with the circuitry 60 for playing back the recorded sound and vice versa.

In all embodiments of the invention employing a combined microphone/speaker 50, the combined microphone/speaker 50 can be multidirectional; that is, it can receive sound from outside the auditory meatus and emit sound into the auditory meatus without the need for reorienting the microphone/speaker 50.

Figure 7:
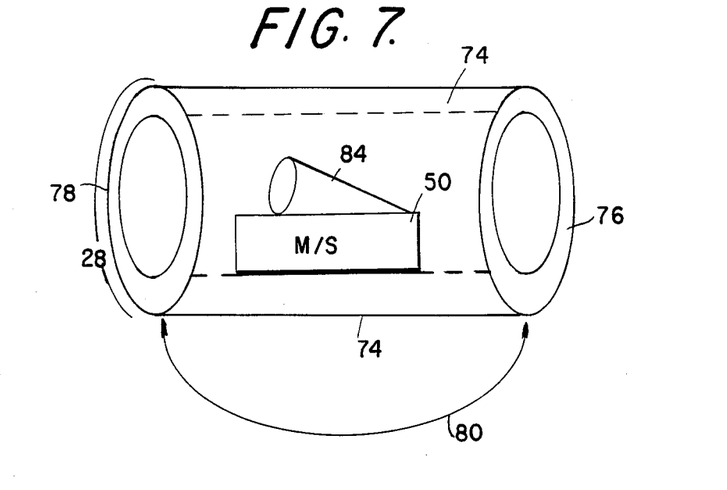
FIG. 7 is a schematic view of an embodiment of the invention showing a unitary microphone/speaker holder supported by the auditory meatus of the user's ear by a housing that has two ends, each end of which is adapted to be inserted in the auditory meatus of the user.
Figure 8:
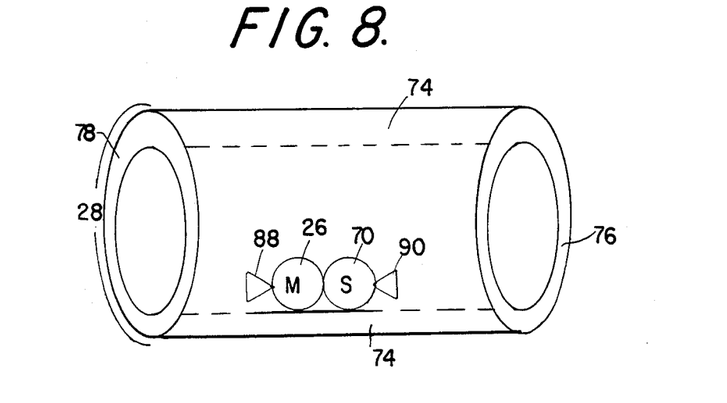
FIG. 8 is a schematic view of an embodiment of the invention showing a microphone and a speaker that are separate and distinct but that are in close proximity to one another and that are supported by a holder that has two ends, each and of which is adapted to be inserted in the auditory meatus of the user; and wherein the microphone faces away from the auditory meatus and the speaker faces toward the auditory meatus.
Figure 9:
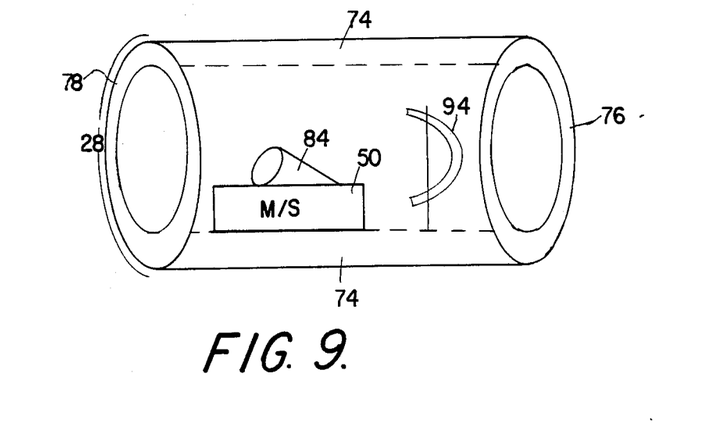
FIG. 9 is a schematic view of an embodiment of the invention showing a unitary microphone/speaker further including a reversible sound reflector for selectively reflecting sound either toward the microphone/speaker in a direction facing away from the auditory meatus of the user or toward the microphone/speaker in a direction facing toward the auditory meatus of the user.

As shown in FIGS. 4–9, the microphone and speaker holder 28 may also be supported by the user's ear. In FIGS. 4–6, the microphone 26 and speaker 70 or the microphone/speaker 50 are supported by the pinna 12 of the user's ear. In FIGS. 7–9, the holder 28 is supported by the auditory meatus 14 of the user.

FIG. 7 is a schematic view of an embodiment of the invention showing a unitary microphone/speaker 50 holder 28 supported by the auditory meatus of the user's ear by a housing 74 that has two ends 76 and 78, each end being adapted to be inserted in the auditory meatus of the user. The microphone/speaker 50 could be multidirectional; however, the microphone/speaker 50 in FIG. 7 has a directional horn 84 facing away from the auditory meatus 14 toward the direction of the sound that is being recorded. In FIG. 7, when sound is being recorded, end 76 is inserted into the auditory meatus 14 of the user. When play back of the recorded sound is being accomplished in FIG. 7, the housing 74 is removed from the user's ear and rotated 180 degrees, as indicated by the arrow 80, so that the directional horn 84 faces toward the auditory meatus 14 of the user. In this orientation, end 78 is inserted into the user's ear.

FIG. 8 is a schematic view of an embodiment of the invention showing a microphone 26 and a speaker 70 that are separate and distinct but that are in close proximity to one another and that are supported by a holder 28 having a housing 74. In FIG. 8, end 76 of the housing 74 is inserted into the auditory meatus 14. The microphone 26 is shown facing away from the auditory meatus 14, and the speaker 70 is facing toward the auditory meatus 14. This arrangement is used both when the microphone 26 is used to record sound and when the speaker 70 is used to play back the recorded sound. In FIG. 8, the microphone 26 is shown with a directional horn 88 facing toward the source of sound to be recorded, and the speaker 70 is shown with a directional horn 90 facing toward the auditory meatus 14 of the user.

FIG. 9 is a schematic view of an embodiment of the invention showing a unitary microphone/speaker 50 having a directional horn 84 further including a reversible sound reflector 94 for selectively reflecting sound either toward the microphone/speaker 50 in a direction facing away from the auditory meatus 14 of the user or toward the microphone/speaker 50 in a direction facing toward the auditory meatus 14 of the user. The use of the sound reflector 94 permits the unitary microphone/speaker 50 having the directional horn 84 to be used for both recording sounds and playing back recorded sounds without removing the housing 74 from the user's ear.

Once again for clarity, when multidirectional microphone/speakers 50 are employed with the invention, there is no need to remove and rotate the microphone/speaker housing 74 of FIG. 7; there is no need to select a reflector position for a reflector 94 of FIG. 9; and there is no need to rotate the ball 52 and socket 54 of FIGS. 4 and 5. And when a separate microphone 26 and separate speaker 70 are used, with the microphone facing toward the source of sound to be recorded and the speaker facing toward the auditory meatus, there is no need for reversing either a housing 74 or a sound reflector 94. Reversing a housing 74 or reflector 94 is used only when the combined microphone/speaker 50 has substantial unidirectional qualities. Unidirectional qualities may be present with or without the presence of a directional horn.

In summary, numerous benefits have been described which result from employing the principles of the invention. With the invention, a system is provided for recording telephone conversations without making electrical connection with the telephone.

With the invention, a portable system is provided that is capable of recording both face-to-face conversations and telephone conversations without alteration of the system.

With the invention, there is provided a means for retaining a microphone connected to a portable audio tape recorder near the inner portion of the auditory meatus of the user.

With the invention, there is provided means for recording telephone conversations without making physical contact between the telephone earpiece and a pick up microphone.

Another benefit of the invention is the provision of a telephone microphone whose operation does not depend upon sound transmitted through the body of the telephone receiver to the microphone.

Still another benefit of the invention is the provision of a telephone microphone whose operation does not depend upon physical contact between a transducer adaptor and the body of the telephone receiver.

Another benefit of the invention is the provision of a telephone conversation recording apparatus that is capable of recording conversations using non-owned telephones such as in a public telephone booth.

11

Furthermore, by using the microphone holder of the invention for retaining a small microphone near or in the auditory meatus of the user, any conventional portable audio recorder in conjunction the small microphone can be converted into a portable telephone conversation recording system or portable face-to-face conversation recording system.

Yet another benefit of the invention is the provision of an audio tape recorder that provides for recording telephone conversations by a small microphone near the auditory meatus of the user and also permits playback of the conversations directly to an ear of the user.

Still another benefit of the invention is the provision of a small single microphone/speaker located near the auditory meatus of the user that both records sounds from a telephone conversation and from a face-to-face conversation when the tape recorder is in the record mode, and that also serves as a speaker to play back recorded sounds to an ear of the user when the recorder is used in the play back mode.

The foregoing description of the invention has been presented for purposes of illustration and description. It is not intended to be exhaustive or to limit the invention to the precise form disclosed. Obvious modifications or variations are possible in light of the above teachings. For example, although the link between the microphone 26 and the recorder 32 is shown to be a cable 30, a radio link could readily be used. When a radio link is used between the microphone 26 and the recorder 32, the recorder 32 may or may not be a portable unit.

The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A system for recording telephone conversations from a telephone having an earpiece, the telephone conversations being recorded by a listener having an ear against the telephone earpiece, there being an air space between the telephone earpiece and the auditory meatus of the listener's ear, a portion of the air space being defined by the telephone earpiece and a portion of the air space being defined by the inner surface of the pinna of the listener's ear, said system comprising:
   means for recording audible sound,
   microphone means for transmitting signals representing sounds of the telephone conversations to said recording means, said microphone means connected to said recording means, said microphone means being small enough to be entirely located in the portion of the air space defined by the inner surface of a pinna of an ear of the listener, thereby permitting a telephone earpiece to be placed against the pinna without touching said microphone means, and
   means for retaining said microphone means in the portion of the air space defined by the inner surface of the pinnar of the listener's ear between the telephone earpiece and the auditory meatus of the listener's ear thereby permitting said recording means to record sound received through the earpiece.

2. The system for recording telephone conversations described in claim 1 wherein said recording means is portable and carried by the listener.

3. The system for recording telephone conversations described in claim 1 wherein said means for retaining said microphone means in the portion of the air space defined by the inner surface of the pinna of the listener's ear between the telephone earpiece and the auditory meatus of the listener is supported by the ear of the listener.

4. The system for recording telephone conversations described in claim 3 wherein said microphone means retaining means is supported by the pinna portion of the ear of the listener.

5. The system for recording telephone conversations described in claim 3 wherein said microphone means retaining means is supported by a hollow ear plug inserted into the outer portion of the auditory meatus of the listener.

6. A system for recording telephone conversations by a listener from a hand-held telephone receiver having an earpiece, a handle, and a mouthpiece, said system comprising:
   a portable audible sound recorder,
   a microphone small enough to be entirely located in an air space defined by the inner surface of a pinna of an ear of the listener, thereby permitting a telephone earpiece to be placed against the pinnar without touching said microphone, said microphone connected to said audible sound recorder,
   means for retaining said microphone entirely in the air space defined by the inner surface of the pinna of the ear of the listener between the telephone earpiece and the auditory meatus of the listener, thereby permitting a telephone earpiece to be placed against the pinna without touching said microphone, thereby permitting said sound recorder to record sound received through the earpiece and sound transmitted from the listener through the telephone mouthpiece and telephone handle to the telephone earpiece.

7. A system for recording both face-to-face conversations and telephone conversations by a listener, comprising:
   a portable audible sound recorder,
   a microphone small enough to be entirely located in an air space defined by the inner surface of a pinna of an ear of the listener, thereby permitting a telephone earpiece to be placed against the pinna without touching said microphone, said microphone connected to said audible sound recorder, and
   means for retaining said microphone entirely in the air space defined by the inner surface of the pinna of the ear of the listener near the auditory meatus of the listener thereby permitting said sound recorder to record sound received through the telephone and sound from a face-to-face conversation.

8. A system for recording both face-to-face conversations and telephone conversations by a listener, comprising:
   a portable audible sound recorder,
   a microphone small enough to be entirely located in an air space defined by the inner surface of a pinna of an ear of the listener, thereby permitting a telephone earpiece to be placed against the pinna without touching said microphone, said microphone connected to said audible sound recorder, and means for retaining said microphone, a portion of said microphone retaining means including an ear plug, a portion of said ear plug being placed in the outer portion of the auditory meatus of the listener thereby permitting said sound recorder to record sound received through the telephone earpiece and sound from a face-to-face conversation.

9. A system for recording telephone conversations by a listener, comprising:
   a portable audible sound recorder,
   a microphone small enough to be entirely located in an air space defined by the inner surface of a pinna of an ear of the listener, thereby permitting a telephone earpiece to be placed against the pinna without touching said microphone, said microphone connected to said audible sound recorder, and
   means for retaining said microphone entirely in the air space defined by the inner surface of the pinnar of the ear of the listener between the telephone earpiece and the auditory meatus of the listener, said microphone permitting said sound recorder to record sound received through the earpiece.

10. A system for recording telephone conversations from a telephone having an earpiece by a listener, said system comprising:
    an audible sound recorder,
    a microphone small enough to be entirely located in an air space defined by the inner surface of a pinna of an ear of the listener thereby permitting a telephone earpiece to be placed against the pinna without touching said microphone, said microphone connected to said audible sound recorder, and
    means for retaining said microphone, a portion of said microphone retaining means including an ear plug, a portion of said ear plug being placed in the outer portion of the auditory meatus of the listener thereby permitting said sound recorder to record sound received through the earpiece.

11. A system for recording telephone conversations by a listener from a telephone having an earpiece, said system comprising:
    a portable audible sound recorder,
    first and second microphones connected to said audible sound recorder,
    means for retaining said first microphone in an air space defined by the inner surface of the pinna of the ear of the listener between the telephone earpiece and the auditory meatus of the listener, and
    means for retaining said second microphone outside the air space defined by the inner surface of the pinna of the ear of the listener thereby permitting the sound of the listener to be readily recorded by said sound recorder.

12. A system for recording telephone conversations by a listener from a telephone having an earpiece, said system comprising:
    an audible sound recorder,
    a microphone small enough to be entirely located in an air space defined by the inner surface of a pinna of an ear of the listener thereby permitting a telephone earpiece to be placed against the pinna without touching said microphone, said microphone connected by a radio link to said audible sound recorder, and
    means for retaining said microphone entirely in the air space defined by the inner surface of the pinna of the ear of the listener between the telephone earpiece and the auditory meatus of the listener thereby permitting said sound recorder to record sound received through the earpiece.

13. A system for recording both face-to-face conversations and telephone conversations by a listener from a telephone having an earpiece, comprising:
    portable audible sound recorder means including means for recording sound and means for playing back the recorded sound,
    unitary microphone/speaker means for serving as both a microphone and a speaker and being small enough to be entirely located in an air space defined by the inner surface of a pinna of an ear of the listener thereby permitting a telephone earpiece to be placed against the pinna without touching said unitary microphone/speaker means,
    means for connecting said unitary microphone/speaker means to said means for recording sound and said means for playing back the recorded sound, and
    means for retaining said unitary microphone/speaker means entirely in the air space defined by the inner surface of the pinna of the listener, thereby permitting said sound recorder means to record sound received through the telephone earpiece and sound from a face-to-face conversation and also permitting the recorded sound to be played back into the auditory meatus of the user.

14. The recording system described in claim 13 further comprising switching means for switching said unitary microphone/speaker means between connection with said means for recording sound and said means for playing back sound.

15. The recording system described in claim 13 further comprising plug means for selectively connecting said unitary microphone/speaker means with either said means for recording sound or said means for playing back the recorded sound.

16. A system for recording both face-to-face conversations and telephone conversations by a listener from a telephone having an earpiece, comprising:
    portable audible sound recorder means having means for recording sound and means for playing back the recorded sound,
    microphone means connected to said audible sound recorder means, said microphone means connected to said means for recording sound,
    speaker means connected to said means for playing back sound,
    means for retaining said microphone means and said speaker means in an air space defined by the inner surface of the pinna of the listener thereby permitting said sound recorder means to record sound received through the telephone earpiece without touching the telephone earpiece and for recording sound from a face-to-face conversation and also permitting the recorded sound to be played back into the auditory meatus of the user, wherein said microphone means and said speaker means include a separate microphone and a separate speaker in close proximity to one another.

17. The recording system described in claim 13 wherein said sound recorded means further includes mode switch means for switching from said microphone means connection with said means for recording sound to said speaker means connection with said means for playing back the recorded sound and vice versa.

18. A microphone holder for a microphone small enough to be entirely located in an air space defined by the inner surface of a pinna of an ear of the listener thereby permitting a telephone earpiece to be placed against the pinna without touching the microphone, the microphone being connected to an audio recorder used by a listener, said microphone holder comprising:

means for retaining the microphone entirely in the air space defined by the inner surface of the pinnar of the ear of the listener near the auditory meatus of the listener, said microphone retaining means being supported by the head of the listener.

19. The microphone holder described in claim 18 wherein said microphone retaining means is supported by the ear of the listener.

20. The microphone holder described in claim 18 wherein said microphone retaining means is supported by the pinna of the listener's ear.

21. The microphone holder described in claim 18 wherein said microphone retaining means is supported by the auditory meatus of the listener's ear.

22. A microphone and speaker holder for a microphone and speaker small enough to be entirely located in an air space defined by the inner surface of a pinnar of an ear of a user thereby permitting a telephone earpiece to be placed against the pinna without touching the microphone and speaker, the microphone and speaker connected to an audio recorder, said microphone and speaker holder comprising:

means for retaining the microphone and speaker entirely in the air space defined by the inner surface of the pinna of the user, said microphone and speaker retaining means being supported by the head of the user.

23. The microphone and speaker holder described in claim 22 wherein said microphone and speaker retaining means is supported by the ear of the user.

24. The microphone holder described in claim 22 wherein said microphone and speaker retaining means is supported by the pinna of the user's ear.

25. The microphone holder described in claim 22 wherein said microphone and speaker retaining means is supported by the auditory meatus of the user's ear.

26. A microphone and speaker holder for a microphone and speaker connected to an audio recorder, said microphone and speaker holder comprising:

means for retaining the microphone and speaker in an air space defined by the inner surface of the pinna of a user, said microphone and speaker retaining means being supported by the head of the user, wherein said microphone and speaker retaining means includes means for reversing the orientation of the microphone and speaker with respect to the auditory meatus of the user.

27. The microphone and speaker holder described in claim 26 wherein said means for reversing the orientation of the microphone and speaker includes a ball and socket connection.

28. The microphone and speaker holder described in claim 26 wherein said means for reversing the orientation of the microphone and speaker includes a housing having two ends, each end of said housing adapted to be inserted in the auditory meatus of the user.

29. The microphone and speaker holder described in claim 26 wherein said means for reversing the orientation of the microphone and speaker includes a housing having one end adapted to be inserted in the auditory meatus of the user, and further includes reversible sound reflecting means for selectively reflecting sound either toward the microphone in a direction facing away from the auditory meatus of the user or toward the speaker in a direction facing toward the auditory meatus of the user.

30. A system for recording both face-to-face conversations and telephone conversations from a telephone having an earpiece, comprising:

portable audible sound recorder means having means for recording sound and means for playing back the recorded sound, microphone means connected to said means for recording sound, speaker means connected to said means for playing back sound, means for retaining said microphone means near an outer portion of an auditory meatus of the user, and means for retaining said speaker means near an auditory meatus of the user, said microphone retaining means permitting said sound recorder means to record sound received through the telephone earpiece and sound from a face-to-face conversation, and said speaker retaining means permitting the recorded sound to be played back into an auditory meatus of the user.

31. Apparatus for sending electrical signals representing human speech from a telephone, having an earpiece, that is listened to by a listener, to a portable audio cassette, battery-powered, sound recorder/player, said apparatus comprising:

a microphone small enough to be entirely located in an air space defined by the inner surface of a pinna of an ear of the listener thereby permitting a telephone earpiece to be placed against the pinna without touching said microphone, said microphone producing signals representing human speech, means for supporting said microphone entirely in the air space, wire means, connected to said microphone, for conducting the signals to the sound recorder/player, and means for electrically connecting said signal conducting means directly to the sound recorder/player.

32. Apparatus for sending electrical signals representing human speech from a telephone, having an earpiece, that is listened to by a listener, to a portable audio cassette, battery-powered, sound recorder/player, having a jack for an external microphone and having a jack for an external speaker, the apparatus comprising:

a unitary microphone/speaker small enough to be entirely located in the air space defined by the inner surface of a pinna of an ear of the listener and permitting a telephone earpiece to be placed against the pinna without touching said unitary microphone/speaker, said unitary microphone/speaker producing signals representing human speech, means for supporting said unitary microphone/speaker entirely in the air space, wire means, electrically connected to said unitary microphone/speaker, for selectively conducting the signals to the external microphone jack of the sound recorder/player or for conducting recorded signals from the external speaker jack of the sound recorder/player to said unitary microphone/speaker, whereby the listener can listen to the recorded speech in privacy, and plug means for connecting said signal conducting means directly to either jack of the sound recorder/player.

* * * * *